(12) United States Patent
Shintani et al.

(10) Patent No.: US 7,010,804 B2
(45) Date of Patent: Mar. 7, 2006

(54) SYSTEM AND METHOD FOR FACILITATING TV CHANNEL PROGRAMMING

(75) Inventors: Peter R. Shintani, San Diego, CA (US); Hirofumi Usui, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 236 days.

(21) Appl. No.: 10/393,225

(22) Filed: Mar. 20, 2003

(65) Prior Publication Data

US 2004/0187168 A1     Sep. 23, 2004

(51) Int. Cl.
*H04N 7/16* (2006.01)
(52) U.S. Cl. .................. 725/142; 725/134; 348/714
(58) Field of Classification Search ........ 725/131–134, 725/139–142, 151–153; 348/731, 732, 714
See application file for complete search history.

(56) References Cited

U.S. PATENT DOCUMENTS

| 5,673,205 | A | * | 9/1997 | Brunson ..................... 725/114 |
| 5,748,732 | A | * | 5/1998 | Le Berre et al. ............ 380/229 |
| 6,388,714 | B1 | * | 5/2002 | Schein et al. ............... 348/563 |
| 2001/0011953 | A1 | * | 8/2001 | Shintani et al. ........ 340/825.22 |
| 2001/0027558 | A1 | * | 10/2001 | Sasselli et al. ................. 725/1 |
| 2002/0059366 | A1 | * | 5/2002 | Yap ........................... 709/203 |
| 2003/0028883 | A1 | * | 2/2003 | Billmaier et al. ............. 725/46 |
| 2004/0172366 | A1 | * | 9/2004 | Muto et al. ................... 705/52 |

* cited by examiner

*Primary Examiner*—Vivek Srivastava
(74) *Attorney, Agent, or Firm*—John L. Rogitz

(57) ABSTRACT

A removable memory device is inserted into a channel information source computer, such as computer connected to the Internet, and channel map information is downloaded to it. The removable device is then removed from the source computer and engaged with a television to download the channel map into the television, thereby avoiding prolonged autoprogramming by the television's receiver.

10 Claims, 1 Drawing Sheet

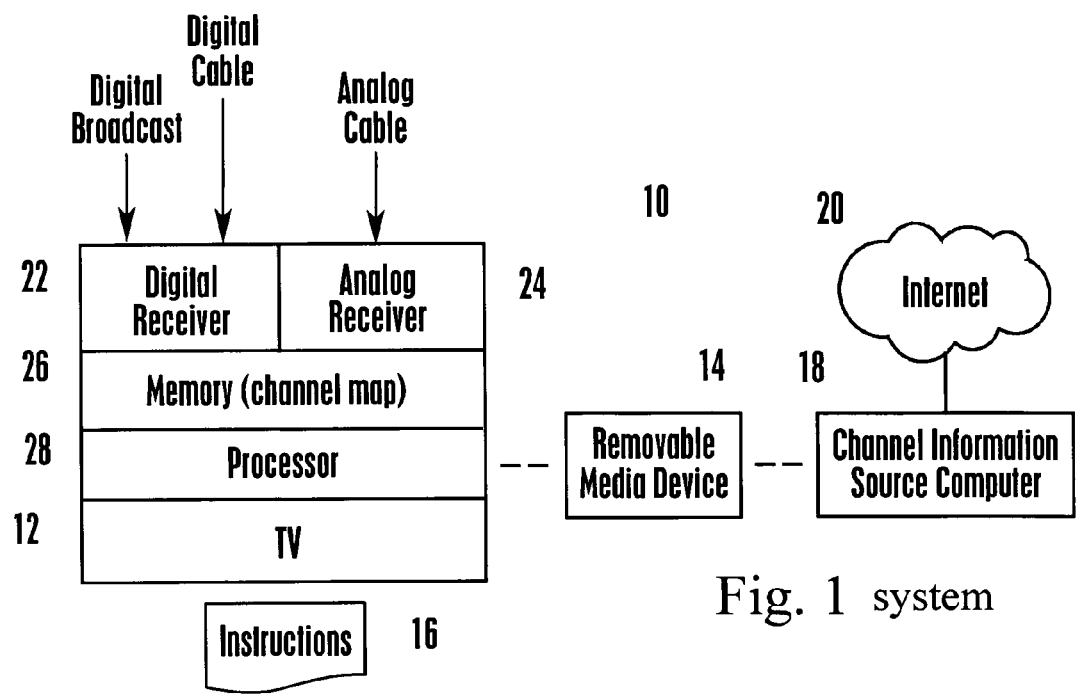
Fig. 1 system
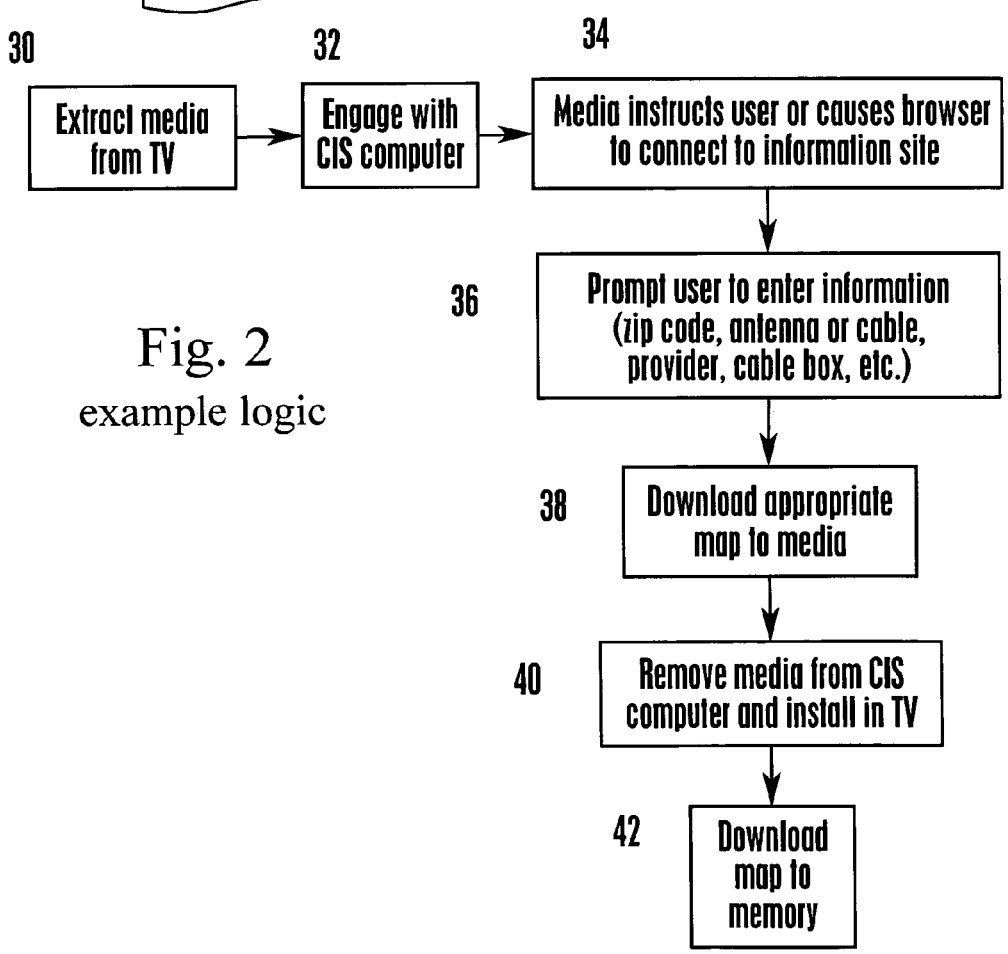
Fig. 2 example logic

US 7,010,804 B2

SYSTEM AND METHOD FOR FACILITATING TV CHANNEL PROGRAMMING

FIELD OF THE INVENTION

The present invention relates generally to televisions.

BACKGROUND OF THE INVENTION

When a television is initially installed in a user's home after purchase, the receivers of the TV search for what channels are available in the area. In conventional analog television sets such automatic search and tuning (referred to as "autoprogramming") might take only a few seconds. Upon completion of the search, the television possesses a channel map that indicates which frequencies/channels are available for subsequent tuning when a user selects a channel.

However, with the advent of digital televisions and hundreds of satellite channels, digital ones of which might in fact carry several sub-channels, the autoprogramming function discussed above can consume an inordinate amount of time. This is not only because of the increased number of channels but also because digital channels are more complicated to map, requiring not just a frequency map but also various decoding information. Furthermore, even with algorithmic efforts to speed up the autoprogram process, much time is still required and because some broadcasts are not available 24 hours per day, some channels can be missed. In the case of terrestrial broadcast the orientation of the antenna can also affect reception to the point where some otherwise available channels might not be detected.

SUMMARY OF THE INVENTION

A method for programming a television with channel information includes engaging a removable memory device with a channel information source computer, and transferring channel information to the memory device. The method also includes disengaging the memory device from the channel information source computer. The memory device may then be engaged with the television such that channel information can be communicated from the memory device to the television. In this way, the television need not autoprogram the channel information using its receivers.

In a preferred embodiment, the memory device initially is included with the television, and a user of the television disengages the memory device from the television prior to engaging the device with the channel information source computer. The source computer may be connected to a wide area network, and the channel information quickly can be downloaded from the wide area network to the memory device. If desired, the memory device can cause the source computer to automatically connect to a site on the wide area network hosting channel information, or it can cause the source computer to prompt a user to connect to the site.

To facilitate downloading the correct channel map information for the user's location and television, the source computer can prompt a user for location information and for television configuration information.

In another aspect, a television has digital reception capability and a fixed memory. A memory device is removably engaged with the television. A substrate bears instructions regarding engaging the memory device with a channel information source computer to retrieve channel map information for loading thereof into the memory of the television.

In still another aspect, a system for programming a television with channel information includes removable memory means and channel information source means. The removable memory means is engageable with the channel information source means for communicating channel map information to the removable memory means. Also, the removable memory means is disengageable with the channel information source means. A television having fixed memory means is also provided. The removable memory means is engageable with the television for communicating channel map information to the fixed memory means.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of one exemplary system architecture; and

FIG. 2 is a flow chart of exemplary logic for programming the television with channel map information.

DETAILED DESCRIPTION OF THE PREFERRED EMBODIMENT

Referring initially to FIG. 1, a system is shown, generally designated 10, that includes a television 12, a removable memory device 14 such as but not limited to a Sony Memory Stick®, and a substrate 16 bearing instructions for using the removable memory device 14 in accordance with the logic discussed below to retrieve channel map information from a channel information source (CIS) computer 18 that may be connected to a wide area network such as the Internet 20. Or, the CIS computer 18 may be the processor of another television that has already been programmed with channel map information. The removable memory device 14 can be engaged and disengaged by hand with both the television 12 and with the CIS computer 18.

As shown in FIG. 1, the preferred non-limiting TV 12 may include a digital receiver 22 for receiving, e.g., digital broadcast signals and digital cable signals, and an analog receiver 24 for receiving, e.g., analog cable signals. The TV 12 may also include a fixed (i.e., not removable) computer memory 26 that can be controlled by a processor 28. The memory 26 may be solid state memory, or disk memory, or other memory type. The TV 12 may be made by Sony. While FIG. 1 shows that the receiver can be a TV receiver, the principles set forth herein can be used with other receivers as well, e.g., with scanning receivers for radio reception, or for configuration of a personal video recorder (PVR) in a PC or video cassette recorder (VCR).

FIG. 2 shows a non-limiting logic for programming the fixed memory 26 with channel map information using the removable media device 14. Commencing at block 30, the removable media device 14, which preferably accompanies the TV 12 during packaging and sale, is removed from the TV 12 (or the accompanying packaging). At block 32 the removable media device 14 is engaged with the CIS computer 18. Moving to block 34, the media 14 may contain software executable by the CIS computer 18 to instruct the user to connect to a channel map information site on the Web, or the media instructions may cause a browser associated with the CIS computer 18 to automatically connect to the channel map information site. In any case, the designated site holds channel map information for a large number of locations.

Once connected to the appropriate site, the logic proceeds to block 36 to prompt the user to enter information useful for downloading appropriate channel map information for the TV 12. For example, the user can be prompted to enter the location (by, e.g., zip code or postal code) of the TV 12. Also, the user may be prompted to enter television configuration information such as but not limited to whether the TV 12 has cable capability, broadcast reception capability, satellite reception capability, antenna capability, a set-top box, and the identity of the service provider.

Using this information, at block 38 the appropriate channel map information for the user's location, possibly accounting for TV 12 configuration, is downloaded from the Web site to the removable media device 14 through the CIS computer 18. The channel information can include locally available channels, frequencies, digital decoding information, digital channel subchannel information, and in general the type of information that would otherwise be obtained using the TV receivers 22, 24 in an autoprogramming function.

At block 40, the removable media device 14 may be removed from the CIS computer 18 and engaged with the TV 12, which can be formed with a suitable media bay to receive the device 14. At block 42, the channel information is downloaded from the removable media device 14 to the fixed memory 26 in the TV 12 for use thereof by, e.g., the processor 28.

If desired, after downloading the channel information into the TV 12, a user can edit the information using a TV remote control or other input device in accordance with channel information editing principles. Once edited, the modified channel information can be copied back onto the removable media device 14, which can be removed from the TV 12 and engaged with other TVs or even the CIS computer to replicate the modified channel information in those devices.

While the particular SYSTEM AND METHOD FOR FACILITATING TV CHANNEL PROGRAMMING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A method for programming a television with channel information, comprising:

engaging a memory device with a source computer;

transferring channel information to the memory device;

disengaging the memory device from the source computer;

engaging the memory device with the television; and communicating channel information from the memory device to the television, wherein the memory device causes the source computer to automatically connect to a site on a wide area network hosting channel information, wherein the memory device initially included with the television, and a user of television disengages the memory device from the television prior to engaging the device with the source computer.

2. The method of claim 1, wherein the source computer is connected to a wide area network, and the channel information is downloaded from the wide area network to the memory device.

3. A system for programming a television with channel information, comprising:

removable memory means;

source means, the removable memory means being engageable with the source means for communicating channel map information to the removable memory means, the removable memory means being disengageable with the source means; and a television having fixed memory means, the removable memory means being engageable with the television for communicating channel map information to the fixed memory means, wherein the removable memory means initially is included with the television, and a user of the television disengages the removable memory means from the television prior to engaging the device with the source means.

4. The system of claim 3, wherein the source means is connected to a wide area network, and the channel information is downloaded from the wide area network to the removable memory means.

5. The system of claim 4, wherein die removable memory means causes the source means to automatically connect to a site on the wide area network hosting channel information.

6. The system of claim 4, wherein the removable memory means causes the source means to prompt a user to connect to a site on the wide area network hosting channel information.

7. The system of claim 3, wherein the source means prompts a user at least for area information to facilitate communicating channel map information to the removable memory means.

8. The system of claim 3, wherein the source means prompts a user at least for television configuration information to facilitate communicating channel map information to the removable memory means.

9. The system of claim 3, wherein the television is not autoprogrammed with the channel information.

10. The system of claim 3, further comprising instruction means regarding use of the removable memory means.

* * * * *